US010171936B2

(12) United States Patent
Allen et al.

(10) Patent No.: US 10,171,936 B2
(45) Date of Patent: Jan. 1, 2019

(54) MATCHING ACTIONABLE EVENTS WITH GOODS AND SERVICES PROVIDERS

(71) Applicant: INTERNATIONAL BUSINESS MACHINES CORPORATION, Armonk, NY (US)

(72) Inventors: Joshua S. Allen, Durham, NC (US); Andrew J. Lavery, Austin, TX (US); Mario A. Maldari, Lyons, CO (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 15/273,946

(22) Filed: Sep. 23, 2016

(65) Prior Publication Data

US 2018/0091938 A1 Mar. 29, 2018

(51) Int. Cl.
| | | |
|---|---|---|
| *H04W 4/021* | (2018.01) | |
| *H04W 64/00* | (2009.01) | |
| *H04L 29/08* | (2006.01) | |
| *H04W 88/02* | (2009.01) | |

(52) U.S. Cl.
CPC ............. *H04W 4/021* (2013.01); *H04L 67/26* (2013.01); *H04W 64/00* (2013.01); *H04W 88/02* (2013.01)

(58) Field of Classification Search
CPC .................................................... H04W 4/021
See application file for complete search history.

(56) References Cited

U.S. PATENT DOCUMENTS

| | | | |
|---|---|---|---|
| 6,571,279 B1 | 5/2003 | Herz et al. | |
| 6,873,970 B2 | 3/2005 | Showghi et al. | |
| 7,940,173 B2 | 5/2011 | Koen | |
| 8,019,532 B2 | 9/2011 | Sheha et al. | |
| 8,126,782 B1 | 2/2012 | Zhu et al. | |
| 8,301,765 B2 | 10/2012 | Goodman | |
| 9,680,943 B1 | 6/2017 | Hassett | |
| 2002/0038259 A1 | 3/2002 | Bergman et al. | |
| 2004/0093281 A1 | 5/2004 | Silverstein et al. | |
| 2006/0271273 A1 | 11/2006 | Lee et al. | |
| 2007/0060108 A1 | 3/2007 | East et al. | |
| 2007/0205278 A1 | 9/2007 | Lovett | |
| 2009/0063274 A1 | 3/2009 | Dublin, III et al. | |
| 2013/0030931 A1* | 1/2013 | Moshfeghi ............. | G01S 19/48 705/16 |

(Continued)

OTHER PUBLICATIONS

Garzon et al., "Geofencing 2.0: Taking Location-Based Notifications to the Next Level,", UBICOMP '14, Sep. 13-17, 2014, Seattle, WA, USA, pp. 919-930.

(Continued)

*Primary Examiner* — Christopher M Brandt
(74) *Attorney, Agent, or Firm* — Conley Rose, P.C.

(57) ABSTRACT

A device comprises an input component configured to receive an event identification request from a provider. The event identification request comprises one or more requirements usable to identify an actionable event for resolution. The requirements specify a geographical boundary and one or more goods. The device also comprises a processor communicably coupled to the input component. The processor is adapted to transmit the event identification request to a repository configured to match the event identification request with one or more actionable events based on the one or more requirements.

15 Claims, 7 Drawing Sheets

(56) References Cited

U.S. PATENT DOCUMENTS

| | | | |
|---|---|---|---|
| 2014/0207611 A1* | 7/2014 | Cleary | G06Q 30/0633 |
| | | | 705/26.8 |
| 2014/0324529 A1* | 10/2014 | Bliss | G06Q 30/08 |
| | | | 705/7.29 |
| 2015/0269531 A1* | 9/2015 | Menayas | G06F 3/04812 |
| | | | 705/7.18 |
| 2016/0034712 A1* | 2/2016 | Patton | G06F 21/6245 |
| | | | 726/28 |
| 2017/0046758 A1* | 2/2017 | Sheehan | G06Q 30/0623 |
| 2017/0278111 A1 | 9/2017 | Gerard et al. | |

OTHER PUBLICATIONS

Di, Tesi Di Laurea., "A Distributed Framework for Proximity-Aware Android Applications," Politecnico Di Milano Academic Year 2014-2015, 143 p.

Office Action dated Oct. 31, 2017, 18 pages, U.S. Appl. No. 15/273,891, filed Sep. 23, 2016.

Notice of Allowance dated May 23, 2018; 5 pages; U.S. Appl. No. 15/273,891, filed Sep. 23, 2016.

* cited by examiner

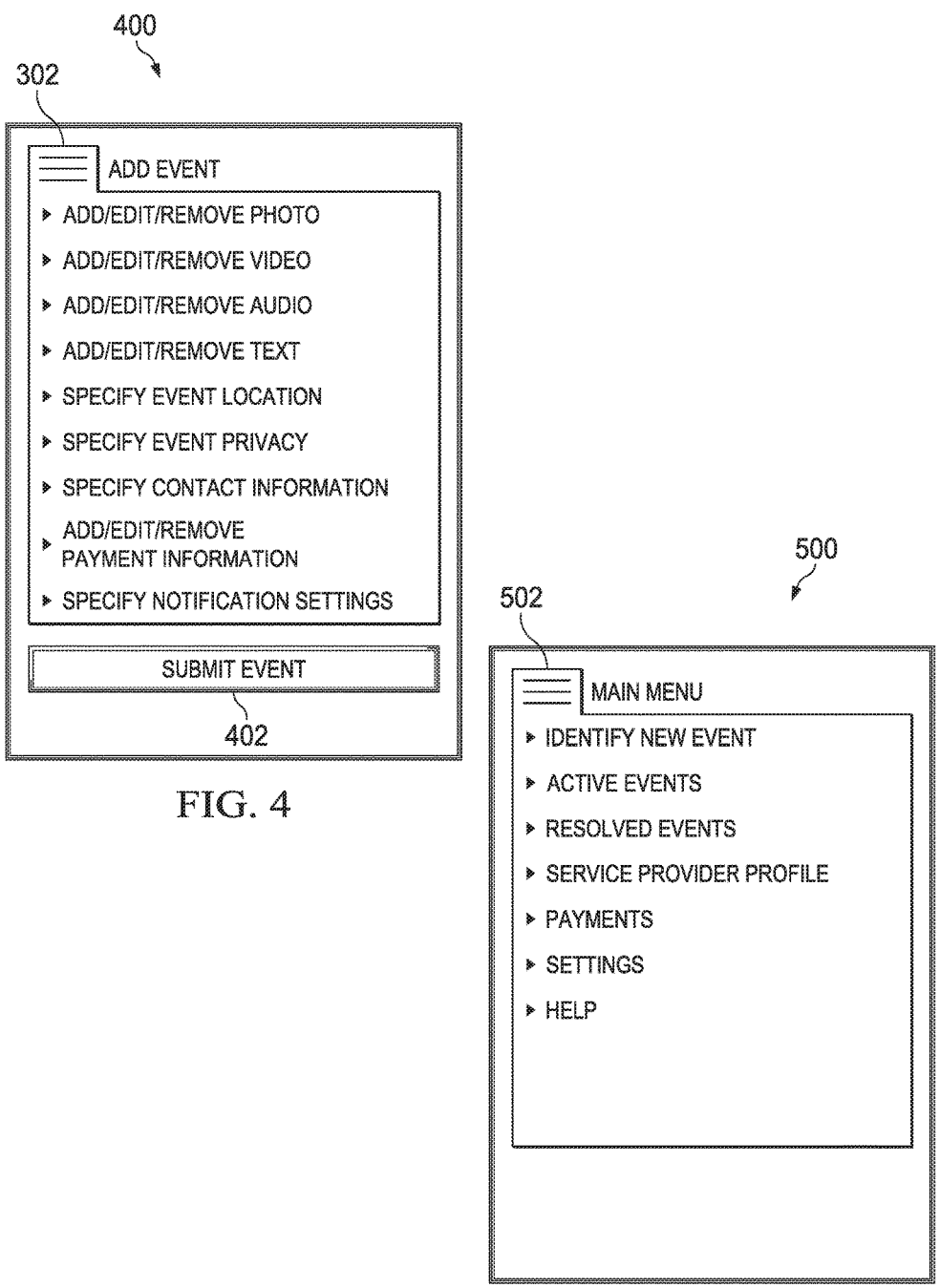

US 10,171,936 B2

MATCHING ACTIONABLE EVENTS WITH GOODS AND SERVICES PROVIDERS

BACKGROUND

Individuals commonly encounter situations in daily life that have no clear path to resolution. For instance, a jogger may encounter a downed power line; a driver may arrive at a signal light that is functioning improperly; or a sports fan may wish to eat sushi while attending a sporting event. In these and similar situations, the individual may not know whom to contact to resolve the situation. For example, the aforementioned jogger may not know that downed power lines should be reported to a specific division within a city's municipal services department. Likewise, the sports fan may not be aware of a sushi restaurant located in an obscure area of the sports stadium.

SUMMARY

In some embodiments, a device comprises an input component configured to receive an event identification request from a provider. The event identification request comprises one or more requirements usable to identify an actionable event for resolution. The requirements specify a geographical boundary and specify one or more goods. The device also comprises a processor communicably coupled to the input component. The processor is adapted to transmit the event identification request to a repository configured to match the event identification request with one or more actionable events based on the one or more requirements.

In some embodiments, a method comprises providing an interface configured to receive event identification requests and receiving an event identification request from a provider. The event identification request comprises requirements usable to identify a matching, actionable event. The requirements specify a geographical boundary and a type of service. The method also comprises transmitting the event identification request to a repository configured to match the event identification request with the actionable event based on the requirements. The method further comprises receiving a notification regarding the match. The method still further includes providing information regarding the match to the provider via the interface.

In some embodiments, a computer program product comprises a computer-readable storage medium having program instructions embodied in the medium. The program instructions are executable by a processor to cause the processor to receive an event identification request from a provider. The event identification request specifies a geographical boundary and at least one of a type of good and a type of service. The processor also provides the event identification request to a repository configured to match the event identification request with an actionable event. The processor further receives a notification regarding the match, and it provides the provider with an option to accept the actionable event. The processor also provides an acceptance signal to the repository when the provider accepts the option.

BRIEF DESCRIPTION OF THE DRAWINGS

FIG. 4 is an illustrative sub-menu of the menu in FIG. 3.

FIG. 5 is an illustrative menu for generating event identification requests.

DETAILED DESCRIPTION

Figure 1:
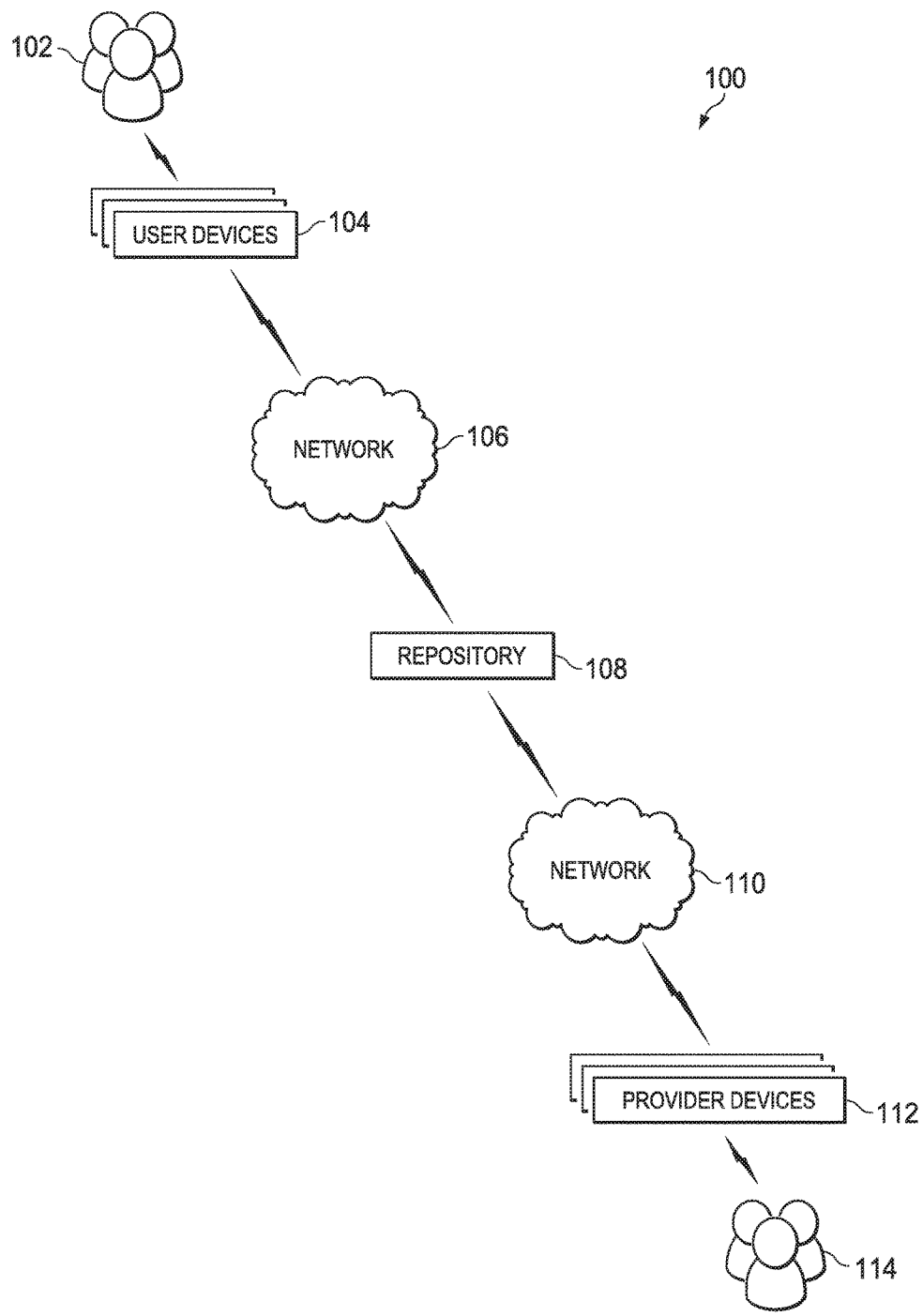
FIG. 1 is a schematic diagram of an illustrative system that implements the matching technique described herein.

This disclosure describes various embodiments of systems and methods for matching actionable events—for example, situations in which an individual perceives no clear path to resolution—with providers of goods and services who are able to resolve such situations for the individual. In at least some embodiments, the individual uses a computing device—such as a smart phone—to report the actionable event. The computing device may provide the user with various options for reporting the event, such as by entering text or by uploading audio, video, or images. The computing device may further enable the user to indicate a geographical location of the event, or, in some embodiments, the computing device may automatically obtain the geographical location of the actionable event using a global positioning system ("GPS") component in the computing device. The computing device transmits this and other relevant information to a repository that collects and stores such information from the user and from any other users who may be providing their own information to the repository.

Providers of goods and services may be interested in resolving the actionable events recorded in the repository. Accordingly, providers may transmit event identification requests ("EIRs") to the repository. Each EIR contains one or more requirements that the repository uses to search its storage for a suitable actionable event that the provider may resolve. Such EIR requirements may specify, for instance, the types of goods or services the provider provides, the geographical area(s) the provider services, etc. The repository then compares the EIR requirements with actionable events stored in the repository, using event data entered by an individual reporting an actionable event, geographical information associated with the event, etc. This comparison may result in a match between an actionable event and the EIR of a service provider. The repository then allows the provider to indicate whether the provider is willing to resolve the matched actionable event(s). Various features of the system facilitate such resolution, including—without limitation—automated payment services (e.g., through PAYPAL® or VINMO®), back-and-forth signaling between the user devices, repository, and provider devices to coordinate the resolution of events, and the like.

In an illustrative, non-limiting scenario, a sports fan attending a football game and sitting in section 301 of a stadium wishes to eat sushi for a snack. The fan may open an app on his smart phone and enter text indicating that he wants salmon sashimi, a caterpillar sushi roll, and extra wasabi. Alternatively or in addition, the fan may record an audio clip requesting the same. Alternatively or in addition, the fan may take a photo of the sushi another sports fan is eating. The smart phone, at the direction of the app, transmits such event data to a repository, along with any other pertinent information, such as the sports fan's geographical location, payment information, a privacy designation indicating who may view the event data, and so on. The repository stores the event data and associated information. Because the repository may receive information from numerous individuals, the repository may organize the information in a database as appropriate—for example, according to type of request, according to geographical location, according to user, etc.

Continuing with this example, a sushi vendor uses an app on her smart phone to search for sports fans desiring sushi in sections 300-305 of the sports stadium. Specifically, she enters requirements—such as keywords (e.g., "sushi"), payment type (e.g., credit card only), and geographical location (e.g., sections 300-305)—into her app. Taken together, these requirements form an EIR. At the direction of the app, the sushi vendor's smart phone transmits the EIR to the repository. The repository compares the sushi vendor's EIR requirements to the various actionable events stored therein and identifies the sports fan's sushi request. The repository provides the sushi request to the sushi vendor's smart phone app for display to the sushi vendor. The vendor may then take appropriate action, such as indicating that she will resolve the event by providing the sports fan with the requested sushi, accepting payment via her smart phone using the credit card payment information provided by the repository, and providing an indication to the smart phone app that the event has been resolved so that the repository may be informed of the same. Alternatively, the vendor may reject the actionable event.

FIG. 1 is a schematic diagram of an illustrative system 100 that implements the matching techniques described herein. Specifically, the system 100 may comprise users 102, each of whom has a user device 104. The users 102 may be co-located or they may be located in different areas. A user device 104 may be a computing device such as a smart phone, a tablet, a personal computer, a computerized personal assistant installed in a vehicle, or some other suitable, electronic communication device. In some embodiments, at least some of the user devices 104 belonging to the different users 102 are different types of devices.

The system 100 also includes a network 106, such as the Internet and/or one or more private and/or public networks. For example, the users 102 may be in different locations throughout the world, and, in such cases, the network 106 may comprise multiple sub-networks, such as the Internet and multiple private networks. The network 106 facilitates communication between the user devices 104 and a repository 108. In some embodiments, the repository 108 is a computing device (e.g., a personal computer) or a collection of computing devices. In some embodiments, the repository 108 may be in a single location, and in other embodiments, the repository 108 may be distributed over multiple locations. As described below, the repository 108 includes storage (e.g., one or more databases) that stores information regarding actionable events received from the user devices 104. As is also described below, the repository 108 includes one or more processors to facilitate the receipt and storage of event information, the receipt and storage of EIRs, the comparison of event information with EIRs, and communications between the user devices and provider devices to coordinate the resolution of actionable events.

Like the network 106, the network 110 may include one or more sub-networks (e.g., the Internet, private networks, public networks). The network 110 facilitates communication between the repository 108 and one or more provider devices 112. A provider device 112 may be a computing device such as a smart phone, a tablet, a personal computer, a computerized personal assistant installed in a vehicle, a computerized cash register, or some other type of suitable electronic device. The provider devices 112 are used by goods and/or services providers 114 to submit EIRs to the repository 108. Providers 114 are individual or corporate entities that are able and willing to resolve events reported by users 102. For example, a sushi vendor may qualify as a provider 114 for an event requiring sushi. A pizza restaurant may qualify as a provider 114 for an event requiring pizza. Municipal services personnel may qualify as a provider 114 for an event involving a damaged fire hydrant or a dysfunctional traffic signal light.

In operation, a user 102 encounters an event. An event may be a broken sidewalk, a leaking sprinkler system or fire hydrant, a request for a commercial transaction (e.g., ordering sushi), or any other situation in which the user 102 is not aware whom she should contact to resolve the situation. In some instances, the event may be a situation in which the user 102 is aware whom she should contact to resolve the situation or is able to determine that information quickly, but the user 102 is unwilling to do so. For instance, the user 102 may wish to order a pizza and she could easily locate the closest pizza restaurant using her smart phone, but it may be easier to simply indicate a wish for pizza and allow a provider to resolve the request.

Still referring to FIG. 1, upon encountering an event, the user 102 provides event data to her user device 104 (using, for instance, an app). The event data may include any information describing the event and may take any suitable form. For example, the event data may include one or more of text data, audio data, video data, and photographic data. In at least some embodiments, the event data—at a minimum—includes information sufficient for a provider to understand the event associated with that event data. For instance, event data describing a request for sushi may include the type and amount of sushi requested. The event data may optionally include additional data beyond that which is necessary for the provider to understand the event. For example, event data describing a sushi request may indicate that the user desires extra wasabi and soy sauce. In another example, a user 102 may use a photograph of a dysfunctional traffic signal light as event data, and the user device 104 may use commonly-available image recognition techniques (e.g., stored as executable code on local memory) to identify the actionable event. In yet another example, a user may record an audio clip of her orally describing the event—for example, a pizza order. In still another example, a user may record a video of an event, such as a stop sign that is frequently disregarded by motorists, and that video may form at least part of the event data that is provided to her user device. Any and all such variations and permutations are contemplated and included within the scope of this disclosure.

After the user 102 has provided suitable event data to her user device 104, the user device 104 transmits the event data to the repository 108. The user device 104 may transmit associated information with the event data to the repository 108. The event data is data describing the event, and associated information is information that is related to the event but that does not directly describe the event itself. Non-limiting examples of such associated information include geographical information pertaining to the event (e.g., the global positioning service ("GPS") coordinates of the event or the GPS coordinates of the user device 104 at the time the event data is submitted); payment information for the user 102 (e.g., a credit card number or credentials to access an account with a third-party financial services vendor like PAYPAL®); and privacy designations for information associated with the actionable event to limit those who can resolve or even view the event to providers having the proper privacy credentials. The user device 104 may collect some or all such associated information automatically (i.e., without repeated user instruction). The repository 108 stores the event data and any other associated information received from the user device 104. Similarly, the repository 108 organizes and stores event data and associated information from one or more other user devices 104. The repository 108 may include one or more database systems (e.g., Structured Query Language (SQL) databases) suitable for storing and organizing received information. Such databases may keep track of each user device, event, and provider device using identifiers (e.g., identification numbers) that are unique within the repository 108.

A provider of goods or services may use a provider device 112 to submit an EIR to the repository 108. As explained, the EIR includes one or more requirements that describe the actionable events that the provider is willing to resolve. For instance, an EIR generated by a pizza vendor in a residential area may require that all actionable events presented to the vendor for potential resolution have (1) event data that includes the word "pizza" in text format, an audio file including the word "pizza," an image that is recognized to contain a pizza, or a video clip that includes an image of a pizza; (2) a geographical location within the adjacent residential area; and (3) a valid credit card number or third-party financial services vendor credentials on file. Each EIR should be carefully designed to account for variations in how users may submit actionable events, including potential misspellings, variations in vernacular (e.g., text messaging jargon and acronyms), and the like. (In some embodiments, the repository 108, which matches EIRs with actionable events, may be programmed to search for and modify incoming event data, information associated with event data, and/or EIRs to a predetermined, standardized format.) The provider 114 generates the EIR using an app on its provider device 112 and subsequently causes the provider device 112 to transmit the completed EIR to the repository 108. The repository 108 receives the EIR and stores it as desired—for instance, according to a predetermined classification scheme.

After having received information regarding actionable events from users 102 and EIRs from providers 114, the repository 108 compares the requirements in the EIRs to the information provided for each actionable event. For example, the repository 108 may compare an EIR requiring "pizza," a geographical location in the residential neighborhood, and credit card or third-party financial services vendor credentials to an actionable event having event data that includes the term "pizza," geographical information that is within the specified residential neighborhood, and a validated PAYPAL® account. More than one matching actionable event may be found for each EIR, and, in that instance, information regarding each actionable event may be transmitted to the provider device 112 for review and possible acceptance by the provider 114. Conversely, more than one matching EIR may be found for each actionable event. In this situation, the repository 108 may "lock" the actionable event when sending information regarding that event to a provider for review and acceptance so that the same actionable event is not simultaneously sent to multiple providers. In other embodiments, the repository 108 may simultaneously send information regarding the actionable event to some or all providers with matching EIRs, and the first provider to accept the offer to resolve the event is assigned responsibility for resolving the event, while the remaining providers who received the event are informed that the event is no longer available to them for acceptance.

When a provider 114 accepts an event, the provider device 112 sends an acceptance signal to the repository 108 to inform the repository 108 about the acceptance. In response, the repository 108 updates its records to indicate that the provider accepted the event. In addition, the repository 108 sends an acceptance signal to the user device 104 that submitted the event data so that the user is informed about the acceptance. Further, the repository 108 may send to each of the parties additional information about the other party—for example, cell phone numbers, e-mail addresses, comments, and so on—to facilitate resolution of the actionable event. In some embodiments, the repository 108 may provide payment information (e.g., credit card number, PAYPAL® account number) to the provider device 112 so that the provider device 112 can interface with the credit card bank or third-party financial services provider to obtain payment. Alternatively, the repository 108 may obtain payment on behalf of the provider device 112 and hold it in escrow until the event has been resolved to the user's satisfaction. In some embodiments, the provider device 112 displays geographical information pertaining to the event to the provider. In some embodiments, the provider 112 uses a built-in GPS system and the geographical information to guide the provider to the event in a step-by-step manner.

When the event has been completed, one or both of the parties may use their device(s) to mark the event as having been resolved. Either or both of the devices may then transmit a completion signal to the repository 108, and the repository 108 updates its records accordingly. If a provider rejects an event, the provider device 112 sends a rejection signal to the repository 108, and the repository 108 records the rejection in the database so that the rejected event is not offered to that provider again.

Figure 2:
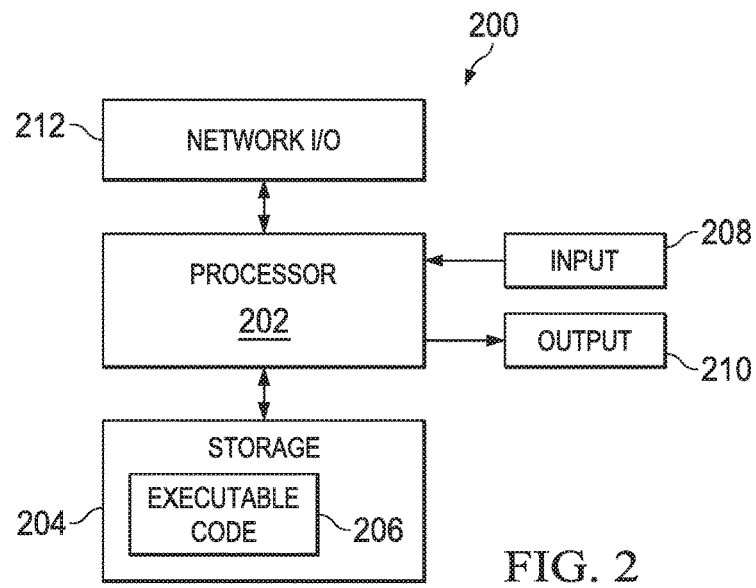
FIG. 2 is a block diagram representing multiple electronic devices in the system of FIG. 1.

FIG. 2 is a block diagram of a computer system 200. Each of the devices 104, repository 108, and provider devices 112 may contain the computer system 200 or a variation thereof. The computer system 200 comprises a processor 202; storage 204 (e.g., random access memory (RAM), read-only memory (ROM)) storing executable code 206 (e.g., software or firmware such as a mobile phone "app"); an input 208 (e.g., a touch screen display along with a graphical user interface (GUI), an audio microphone, a camera, alphanumeric keys or buttons); an output 210 (e.g., a display and a graphical user interface (GUI) shown on the display); and a network input/output (I/O) interface 212 to facilitate communication between the processor 202 and devices external to the computer system 200. Actions attributed herein to a user device 104, the repository 108, or a provider device 112 are performed by a processor 202 housed therein as a result of executing the code 206 stored therein. Human input provided to a user device 104, the repository 108, or a provider device 112 is provided to an input 208. Output provided by a user device 104, the repository 108, or a provider device 112 is provided by an output 210. Communications between a user device 104 and a device external to the user device 104 occur via the network I/O interface 212, and the same is true for the repository 108 and devices external to the repository 108, as well as for a provider device 112 and a device external to the provider device 112.

As explained above, each user device 104 and provider device 112 runs an app (e.g., executable code 206 in FIG. 2). Users and providers interact with their devices using these apps. When executed, the apps cause the processors on these devices to display various graphical user interfaces (GUIs).

The hardware displays (e.g., touchscreens) on these devices, in tandem with the displayed GUIs, constitute interfaces that provide users and providers with a complete range of options in submitting and resolving actionable events.

Figure 3:
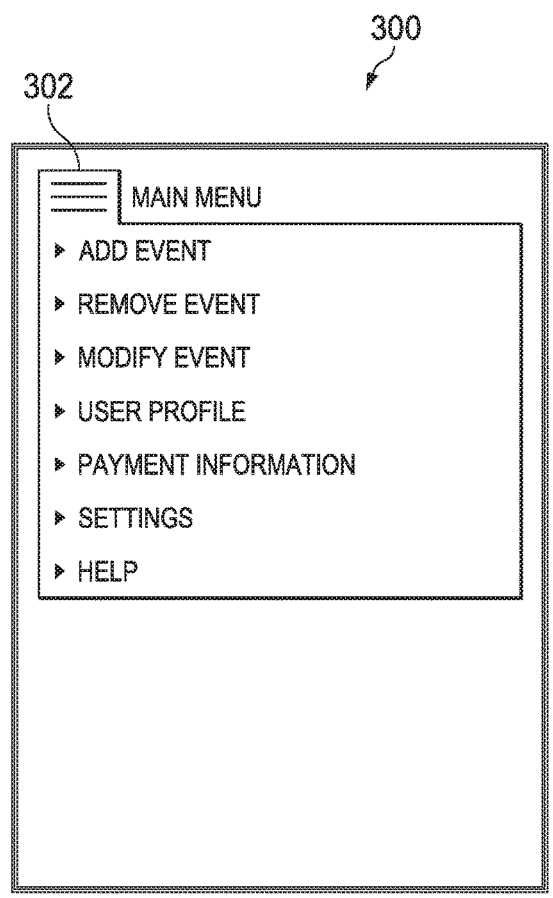
FIG. 3 is an illustrative menu for reporting actionable events.

FIGS. 3-6 depict sample GUIs that may be displayed on the user or provider devices. The scope of disclosure is not limited to these illustrative GUIs. FIG. 3 depicts an illustrative menu 300 for reporting actionable events on a user device 104. The menu 300 is a main menu, meaning that it exemplifies the initial screen that may be displayed when the app is launched on a user device 104. The menu 300 includes a menu button 302, which, when tapped, causes the drop-down menu to appear. The drop-down menu includes various options, such as "ADD EVENT," which enables users to add new actionable events for submission to the repository; "REMOVE EVENT," which enables users to recall events already submitted to the repository; "MODIFY EVENT," which enables users to modify events already submitted to the repository; "USER PROFILE," which enables users to adjust various settings associated with the user's account, such as passwords; "PAYMENT INFORMATION," which enables users to enter credit card information or third-party financial services vendor login credentials; "SETTINGS," which enables users to adjust, for instance, privacy preferences and whether the app should use a GPS system on the device to automatically detect geographical locations of events; and "HELP," which provides the user with help on a range of issues related to the app or to the system as a whole.

FIG. 4 depicts an "ADD EVENT" sub-menu 400, which appears when the "ADD EVENT" option in FIG. 3 is selected. The sub-menu 400 includes a range of options, including options to add, edit, or remove photos, videos, audio clips, and/or text, all of which together constitute event data describing an actionable event. The sub-menu 400 also enables the user to provide associated information to accompany the event data—for instance, to specify the geographical location of the event (either manually or by permitting the app to determine location using a GPS system on the device); to specify privacy designations to ensure that the repository 108 only permits those providers with proper privacy credentials to view event data and associated information submitted using that user device; to specify contact information to facilitate communications with a provider; to add, edit, or remove payment information from the event submission being generated; and to specify notification settings, which enables the user to control how and when the repository 108 and/or providers contact the user. A user may use each of these options in the sub-menu 400 to compile event data and associated information. When the user taps any of the options, a new GUI appears to enable the user to enter the appropriate information. Once all relevant information has been entered using the sub-menu 400, the user may tap the "SUBMIT EVENT" option 402, which causes all entered event data and associated information to be transmitted to the repository 108. The user is then returned to the main menu 300, which may also be accessed at any time by tapping the menu button 302.

FIG. 5 is an illustrative menu 500 for generating EIRs on a provider device 112. The menu 50 includes a menu button 502 which, when tapped, produces the drop-down menu 500 shown in FIG. 5. The menu 500 provides various options, including "IDENTIFY NEW EVENT," which enables the provider to assemble a set of requirements for a new EIR; "ACTIVE EVENTS," which enables the provider to view all currently pending events that the provider has agreed to resolve but that have not yet been resolved; "CLOSED EVENTS," which enables the provider to view all resolved events; "SERVICE PROVIDER PROFILE," which enables the provider to adjust various profile settings, such as the provider's business address; "PAYMENTS," which enables the provider to view financial information pertaining to events that are being resolved or that have already been resolved; "SETTINGS," which enables the provider to select various options pertaining to the provision of its goods or services (e.g., the maximum number of actionable events the provider wants to view for each EIR); and "HELP," which provides the provider with help on a range of issues related to the app or to the system as a whole.

Figure 6:
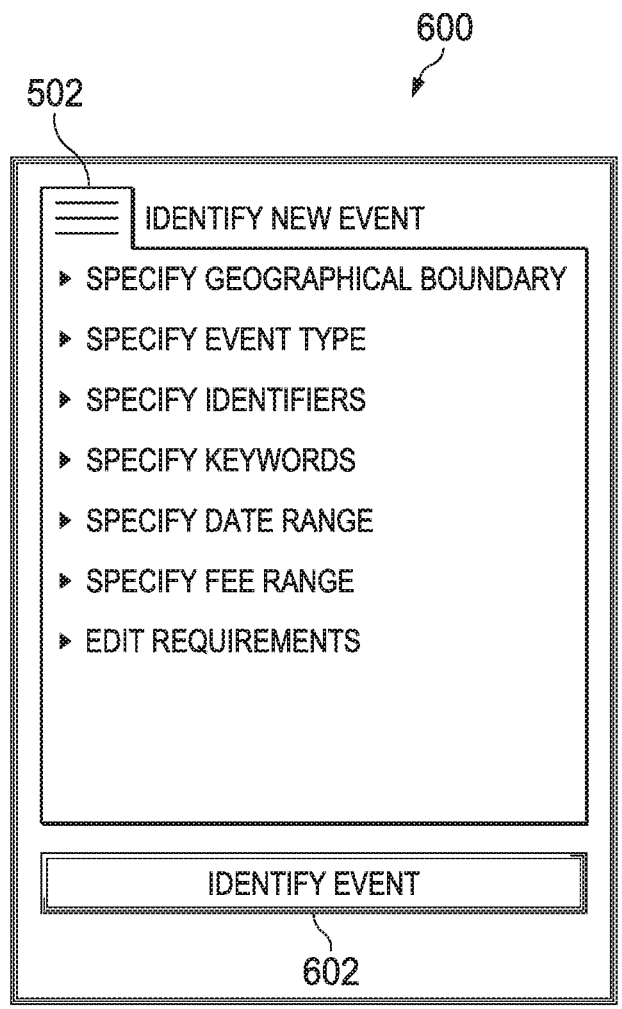
FIG. 6 is an illustrative sub-menu of the menu in FIG. 5.

FIG. 6 is an illustrative sub-menu 600 of the menu in FIG. 5. The sub-menu 600 appears when the "IDENTIFY NEW EVENT" option is selected from the menu 500. The sub-menu 600 enables the user to generate a new EIR. Specifically, the sub-menu 600 includes options to specify the geographical boundaries within which the provider is willing to resolve events; types of events that the provider is willing to resolve; identifiers that represent standardized codes (e.g., alphanumeric codes) for specific types of events (e.g., an identifier of "p1" representing pizza requests); keywords (e.g., "pizza," "sushi," "traffic light") that the repository 108 should look for when comparing the EIR to event data and associated information; a date range within which events must have been reported to the repository 108 in the past or within which events must be reported to the repository 108 in the future; a fee range that specifies the minimum amount the user must be willing to pay to have the event resolved; and an option to edit the list of requirements that appear in the sub-menu 600 by adding, deleting or modifying one or more requirements. Once the provider has generated an EIR to his satisfaction using the sub-menu 600, he may tap the "IDENTIFY EVENT" option 602 to transmit the EIR to the repository 108 for matching with one or more actionable events.

Figure 7:
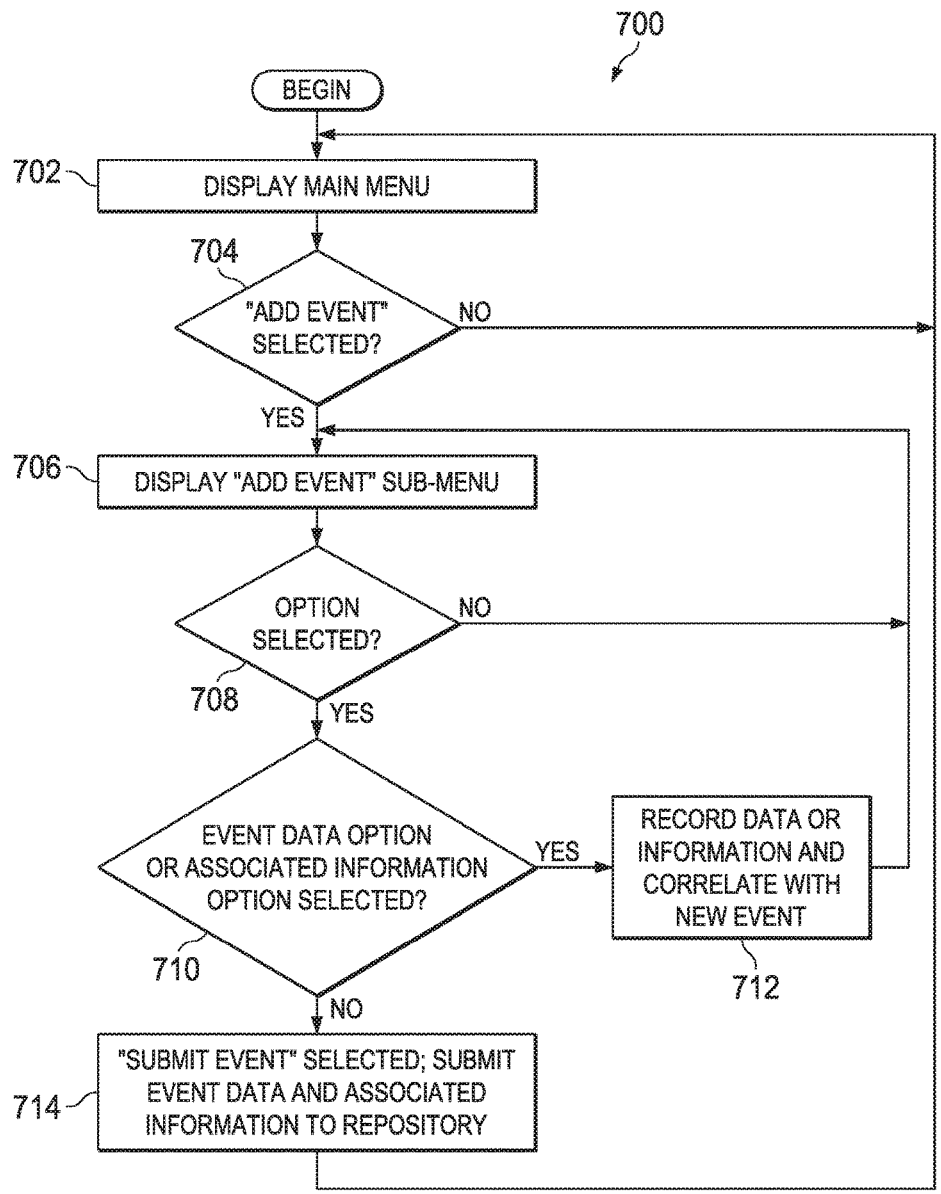
FIG. 7 is a flow diagram depicting an illustrative process for reporting actionable events.

FIG. 7 is a flow diagram depicting an illustrative process 700 for reporting actionable events to a repository. Each step of the process 700 is performed by a user device 104 (FIG. 1). More specifically, as shown in FIG. 2, each user device 104 comprises executable code 206 (e.g., a mobile phone app) which, when executed by the processor 202, causes the processor 202 to perform each step of the process 700. In performing each step of the process 700, the processor 202 may use one or more other hardware components of the user device 104, such as the input 208, output 210, and network I/O 212. Other hardware and/or software components not specifically shown in FIG. 2 also may be used as appropriate. The steps of the process 700 are now described with respect to FIGS. 2, 3, and 4. The process 700 begins with the processor 202 displaying the main menu (step 702). An illustrative main menu 300 is shown in FIG. 3 and is described above. The process 700 comprises the processor 202 determining whether the user has selected the "ADD EVENT" option from the main menu (step 704). If not, control of the process 700 reverts to step 702 (or, if another option is selected from the main menu, a different process is initiated). In this manner, the processor 202 monitors user activity until the "ADD EVENT" option is selected. If the "ADD EVENT" option is selected at step 704, the process 700 comprises the processor 202 displaying the "ADD EVENT" sub-menu (step 706). FIG. 4 provides an example of such a sub-menu and is described above.

The process 700 continues with the processor 202 determining whether an option on the sub-menu has been selected (step 708). If not, control of the process 700 returns to step 706 and, in this manner, the processor 202 may monitor user activity until an option from the sub-menu has been selected. If, however, an option on the sub-menu is selected at step 708, the processor 202 determines whether an event data option or associated information option has been selected (step 710). An event data option is an option on the sub-menu that enables the user to provide data describing the event. An associated information option is an option on the sub-menu that enables the user to provide miscellaneous information that is associated with the event but that does not directly describe the event itself—for instance, geographical information describing where the event occurred. Referring, for instance to FIG. 4, the first four options listed on sub-menu 400 are event data options because they describe the event itself. The remaining options are associated information options, as they enable the user to provide information associated with the event but not directly describing the event itself. If either an event data option or associated information option has been selected from the sub-menu at step 710, the processor 202 records the event data or associated information and correlates it with the event in its local memory—for example, in a database file (step 712). Control of the process 700 then returns to step 706.

If an option has been selected at step 708 but it is not an event data option or associated information option, then it is likely or certain that the "SUBMIT EVENT" option 402 has been selected. Accordingly, the processor 202 transmits the event data and associated information to the repository (step 714). The processor 202 may optionally assign a single identifier to the event data and associated information so that all data and information pertaining to the event are referred to with that identifier. The processor 202 may transmit the identifier with the event data and associated information so that the user device, repository, and provider device all use the same identifier to refer to the same event. Control of the process 700 then returns to step 702. The method 700 may be modified as desired, including by adding, deleting, modifying, or rearranging one or more steps.

Figure 8:
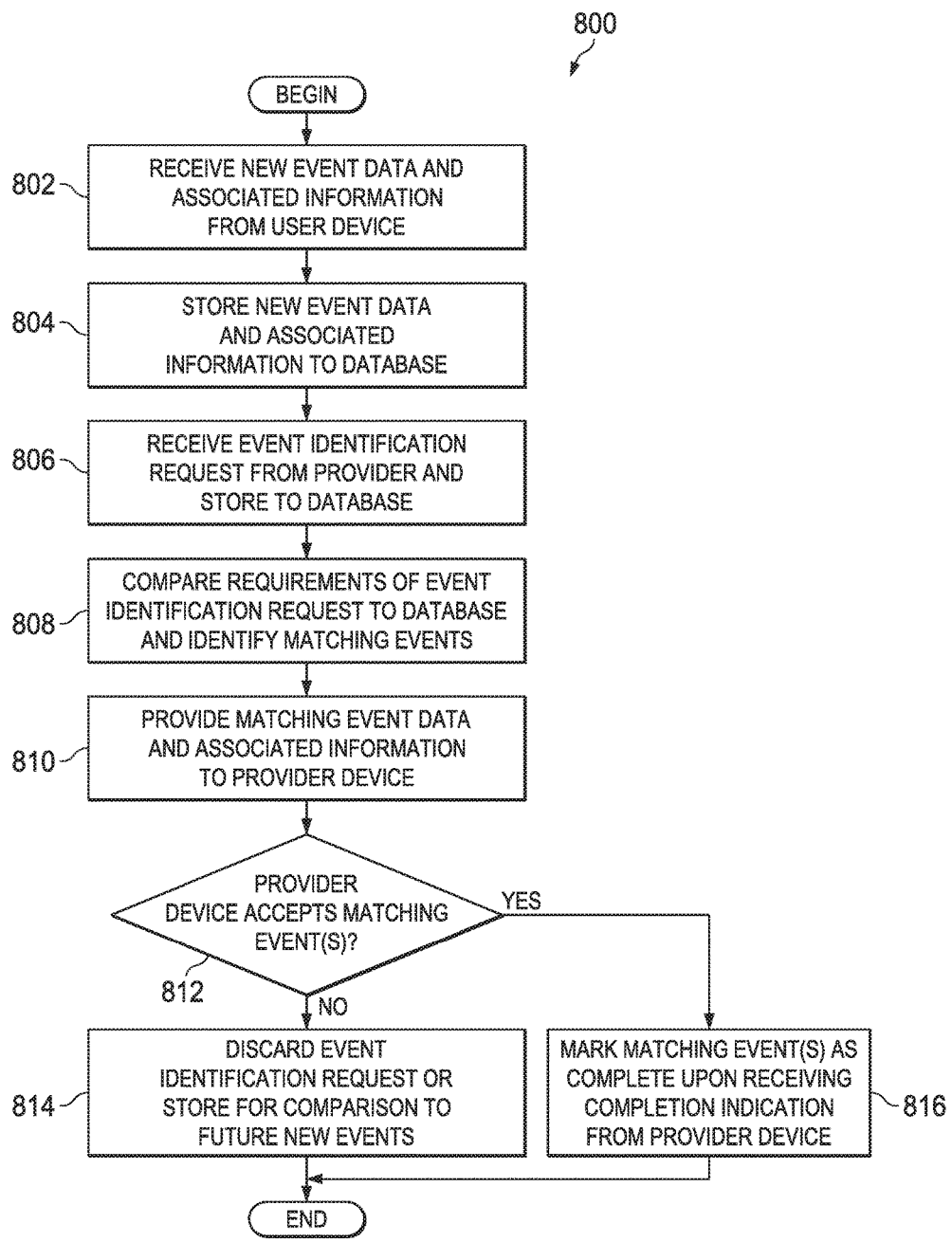
FIG. 8 is a flow diagram depicting an illustrative process for matching actionable events with event identification requests from goods and services providers.

FIG. 8 is a flow diagram depicting an illustrative process 800 for matching actionable events with event identification requests from goods and services providers. Each step of the process 800 is performed by a repository 108 (FIG. 1). More specifically, as shown in FIG. 2, each repository 108 comprises executable code 206 which, when executed by the processor 202, causes the processor 202 to perform each step of the process 800. In performing each step of the process 800, the processor 202 may use one or more other hardware components of the repository 108, such as the input 208, output 210, and network I/O 212. Other hardware and/or software components not specifically shown in FIG. 2 also may be used as appropriate. The process 800 begins with the processor 202 receiving new event data and associated information from a user device (step 802). The processor 202 then stores the new event data and associated information to its database (step 804). The database may be local to the repository 108 or may be located remotely (e.g., in a distributed fashion) from the repository 108.

Next, the processor 202 receives an EIR from a provider device and stores the EIR to the database (step 806). The processor 202 then compares the requirements of the EIR to the events (and, more specifically, to event data and associated information for each event) stored in the database (step 808). The processor 202 provides a matching event (e.g., event data and associated information) to the provider device (step 810). The processor 202 then determines whether the provider device has accepted the matching event (step 812). If so, the processor 202 waits for a completion indication from the provider device and/or the user device indicating that the event has been resolved. Upon receiving the completion indication(s), the processor 202 marks the resolved event as complete in its database (step 816). If, however, the provider rejects the matching event (step 812), the processor 202 discards the EIR or stores the EIR for comparison to future events received from the user device or from other user devices (step 814).

In some embodiments, the processor 202 stores the EIR for a predetermined length of time specified in the EIR requirements and repeatedly compares the EIR requirements to events in the database for that length of time. Matches identified during this length of time are reported to the provider device as they arise. Similarly, in some embodiments, the processor 202 stores event data and associated information for a predetermined length of time that may, for instance, be specified in the associated information. The processor 202 repeatedly compares the event data and associated information to EIRs in the database for that predetermined length of time, and it reports matches identified during this time to the provider device as they arise. While the steps of process 800 are described with respect to a single user device and a single provider device, the process 800 may be modified as appropriate to accommodate multiple user devices and/or multiple provider devices. In addition, the process 800 may be modified as desired, including by adding, deleting, modifying, or rearranging one or more steps.

Figure 9:
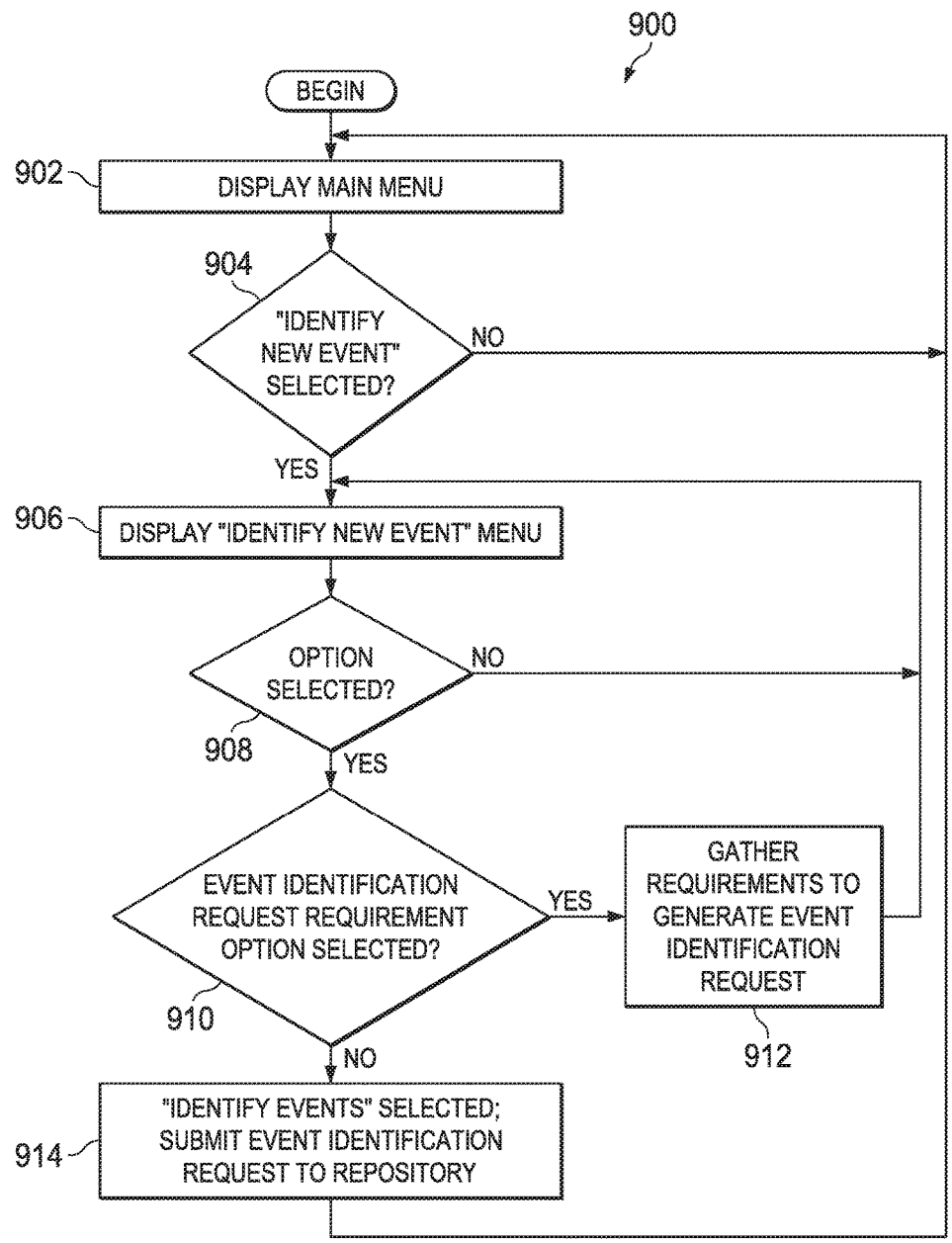
FIG. 9 is a flow diagram depicting an illustrative process for generating event identification requests.

FIG. 9 is a flow diagram depicting an illustrative process for generating event identification requests. Each step of the process 900 is performed by a provider device 112 (FIG. 1). More specifically, as shown in FIG. 2, each provider device 112 comprises executable code 206 (e.g., a mobile phone app) which, when executed by the processor 202, causes the processor 202 to perform each step of the process 900. In performing each step of the process 900, the processor 202 may use one or more other hardware components of the provider device 112, such as the input 208, output 210, and network I/O 212. Other hardware and/or software components not specifically shown in FIG. 2 also may be used as appropriate. The steps of the process 900 are now described with respect to FIGS. 2, 5, and 6. The process 900 begins with the processor 202 displaying a main menu (step 902). FIG. 5 depicts an illustrative main menu 500 that is described above. The processor 202 then determines whether the "IDENTIFY NEW EVENT" option is selected (step 904). If it is not, control of the process 900 returns to step 902 (or, if another option is selected from the main menu, a different process is initiated). In this manner, the processor 202 may monitor provider activity on the main menu. Otherwise, if the "IDENTIFY NEW EVENT" option is selected at step 904, the processor 202 displays the "IDENTIFY NEW EVENT" sub-menu (step 906). FIG. 6 depicts an illustrative sub-menu 600 and is described above.

The processor 202 then determines whether an option on the sub-menu is selected (step 908). If not, control of the process 900 returns to step 906. Otherwise, if an option on the sub-menu has been selected, the processor 202 determines whether an EIR requirement option was selected from the sub-menu (step 910). Referring briefly to FIG. 6, the first seven options listed are EIR requirement options because they enable the provider to enter requirements that collectively constitute an EIR. If such an option is selected at step 910, the processor 202 receives the requirements from the provider and uses them to generate an EIR (step 912). A provider may wish to select multiple options from the sub-menu when generating an EIR, and so control of the process 900 then returns to step 906. The processor 202 repeats this loop until an option is selected at step 908 but the processor 202 determines that the selected option is not an EIR requirement option (step 910). In this case, the processor 202 determines that the "IDENTIFY EVENTS" option 602 has been selected, and so the processor 202 submits the completed EIR to the repository (step 914). In at least some embodiments, the processor 202 assigns a single identifier to the EIR and transmits the identifier to the repository in tandem with the EIR. The provider device, repository, and user device all may use this single identifier to refer to the EIR. The process 900 may be modified as desired, including by adding, deleting, modifying, or rearranging one or more steps.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A first device, comprising:
  a touchscreen display configured to receive an event identification request from a first user via a graphical user interface (GUI), wherein the event identification request comprises one or more requirements usable to identify one or more actionable events stored in a repository device, wherein the one or more requirements specify a geographical boundary and one or more goods or services, and wherein the one or more actionable events correspond to one or more dysfunctional devices reported by one or more second users of one or more second devices; and
  a processor communicably coupled to the touchscreen display and configured to:
    cause the touchscreen display to display the GUI to receive the event identification request from the first user by causing the touchscreen display to display a menu button that, when a tap by the first user is detected, causes the touchscreen display to display a drop-down menu that includes a first option that, when a selection by the first user is detected, causes the touchscreen display to display a second drop-down menu that presents different selectable request aspects to enable entry of the one or more requirements of the event identification request;
    transmit the event identification request to the repository device to determine whether the repository device stores at least one actionable event of the one or more actionable events that matches the one or more requirements of the event identification request;
    receive a notification indicating that the at least one actionable event matches the one or more requirements of the event identification request; and
    cause the touchscreen display to provide the first user with an option to accept the at least one actionable event.

2. The first device of claim 1, wherein the processor is configured to transmit a privacy credential to the repository device, and wherein the processor is configured to receive information regarding only those actionable events associated with the privacy credential.

3. The first device of claim 1, wherein the first device is a smart phone.

4. The first device of claim 1, wherein the processor is configured to repeatedly receive information regarding matching the one or more actionable events over a period of time that is defined via the touchscreen display.

5. The first device of claim 1, wherein the processor is configured to facilitate communication between the first user and the one or more second users.

6. The first device of claim 1, wherein the one or more requirements includes a range of dates on which the one or more actionable events were reported.

7. A method, comprising:
  displaying, by a touchscreen display, a graphical user interface (GUI) configured to receive event identification requests from a first user;
  receiving, by the touchscreen display, an event identification request from the first user, wherein the event identification request comprises requirements usable to identify one or more actionable events stored in a repository device, wherein the requirements specify a geographical boundary and a type of repair or replacement service, wherein the one or more actionable events correspond to one or more dysfunctional devices that are reported by one or more second users of one or more second devices, and wherein receiving the event identification request includes:
    displaying, by the GUI, a menu button;
    receiving, by the GUI, a tapping selection from the first user;
    displaying, by the GUI responsive to receiving the tapping selection, a drop-down menu that includes a first option;
    receiving, by the GUI, a second tapping selection from the first user;
    displaying, by the GUI and responsive to receiving the second tapping selection, a second drop-down menu that presents different selectable request aspects to enable entry of the requirements of the event identification request;
  transmitting the event identification request to the repository device to determine whether the repository device stores at least one actionable event of the one or more actionable events that matches the requirements of the event identification request;
  receiving a notification indicating that the at least one actionable event matches the requirements of the event identification request;
  providing information regarding the at least one actionable event to the first user via the touchscreen display; and
  providing, by the touchscreen display, the first user with an option to accept the at least one actionable event.

8. The method of claim 7, further comprising receiving contact data associated with the at least one actionable event when the at least one actionable event is accepted.

9. The method of claim 8, further comprising using the contact data to receive and provide communications regarding the at least one actionable event.

10. The method of claim 7, further comprising providing a signal to the repository device to change a classification of the at least one actionable event when the at least one actionable event is accepted.

11. The method of claim 7, further comprising providing the information regarding the match to the first user via the touchscreen display only if a privacy credential matches one or more privacy designations associated with the at least one actionable event.

12. A computer program product comprising a computer-readable storage medium having program instructions embodied therewith, the program instructions executable by a processor to cause the processor to:
    cause a touchscreen display to display a graphical user interface (GUI);
    receive an event identification request from a first user via the GUI by:
        causing the GUI to display a menu button;
        receiving, by the GUI, a tapping selection from the first user;
        displaying, by the GUI responsive to receiving the tapping selection, a drop-down menu;
        receiving, by the GUI, a second tapping selection from the first user; and
        displaying, by the GUI and responsive to receiving the second tapping selection, a second drop-down menu that presents different selectable request aspects to enable entry of requirements usable to identify one or more actionable events stored in a repository device, wherein the event identification request comprises the requirements, wherein the one or more actionable events correspond to one or more dysfunctional devices that are reported by one or more second users of one or more second devices, and wherein the event identification request specifies a geographical boundary and at least one of a type of good and a type of service;
    provide the event identification request to the repository device to determine whether the repository device stores at least one actionable event of the one or more actionable events that matches the requirements of the event identification request;
    receive a notification indicating that the at least one actionable event matches the requirements of the event identification request;
    provide, by the touchscreen display, the first user with an option to accept the at least one actionable event; and
    provide an acceptance signal to the repository device when the first user accepts the at least one actionable event.

13. The computer program product of claim 12, wherein the program instructions executable by the processor further cause the processor to guide the first user to a geographical location of the at least one actionable event.

14. The computer program product of claim 12, wherein the program instructions executable by the processor further cause the processor to interface with a third-party financial services vendor to obtain payment.

15. The computer program product of claim 12, wherein the processor receives the event identification request via a smart phone application.

* * * * *